US009754242B2

United States Patent
Klinker et al.

(10) Patent No.: US 9,754,242 B2
(45) Date of Patent: Sep. 5, 2017

(54) DEPLOYMENT MECHANISM FOR NON-VERSIONING BUSINESS PROCESS ARTIFACTS

(75) Inventors: Boris Klinker, Karlsruhe (DE); Sören Balko, Weinheim (DE); Matthias Miltz, Heidelberg (DE)

(73) Assignee: SAP SE, Walldorf (DE)

( * ) Notice: Subject to any disclaimer, the term of this patent is extended or adjusted under 35 U.S.C. 154(b) by 1699 days.

(21) Appl. No.: 12/952,502

(22) Filed: Nov. 23, 2010

(65) Prior Publication Data

US 2012/0130906 A1    May 24, 2012

(51) Int. Cl.
G06Q 10/00 (2012.01)
G06Q 10/10 (2012.01)

(52) U.S. Cl.
CPC .................. G06Q 10/103 (2013.01)

(58) Field of Classification Search
CPC ..................................................... G06Q 10/103
USPC ......................................... 705/1, 1.1, 7, 301
See application file for complete search history.

(56) References Cited

U.S. PATENT DOCUMENTS

| 2008/0183514 A1* | 7/2008 | Moulckers et al. | 705/7 |
| 2009/0077044 A1* | 3/2009 | Krishnaswamy et al. | 707/3 |
| 2010/0153153 A1* | 6/2010 | Balko et al. | 705/7 |
| 2011/0154336 A1* | 6/2011 | Balko | 718/100 |

* cited by examiner

Primary Examiner — Lynda Jasmin
Assistant Examiner — Kimberly Evans
(74) Attorney, Agent, or Firm — Buckley, Maschoff & Talwalker LLC (57) ABSTRACT

According to some embodiments, it may be detected that a deployment archive to be deployed to a runtime server includes first and second business process artifacts, wherein the first artifact supports versioning and the second artifact does not support versioning. A version identifier to be associated with the second artifact may then be calculated, and at least one prior version identifier of the second artifact, associated with at least one prior deployment of the deployment archive to the runtime server, may be determined based on information from a version history database. The deployment archive containing the first and second artifacts may then be deployed to the runtime server along with the prior versions of the second artifact associated with the determined prior version identifiers. A new version history may then be stored in the version history database by adding the newly calculated version identifier to the at least one determined prior version identifier.

20 Claims, 7 Drawing Sheets

| ARTIFACT ID | ARTIFACT VERSION ID | DATE |
|---|---|---|
| A_01 | V79025379023 | 1/1/2012 |
| A_01 | V88907025302 | 1/15/2012 |
| A_01 | V02537892533 | 1/20/2012 |
| A_01 | V82369548360 | 1/21/2010 |

*FIG. 7*

DEPLOYMENT MECHANISM FOR NON-VERSIONING BUSINESS PROCESS ARTIFACTS

FIELD

Some embodiments relate to business process artifacts. More specifically, some embodiments are associated with a deployment mechanism for non-versioning business process artifacts.

BACKGROUND

A business process may coordinate actions performed by people and/or devices. To reflect real-world workflows, a business process may contain asynchronous steps that could span a significant period of time (e.g., lasting several months). During that time, artifacts associated with the business process may be subject to change (e.g., via patches or other updates). These changes, however, should not have an impact on the instances of the business process that are already running. Instead, the changes should result in a new, separate process version that is isolated from older process versions.

Note that business processes may be associated with complex entities that assemble various artifacts representing different perspectives, such as control flow, data flow, and/or connectivity. When transforming a process model into an executable runtime representation (e.g., a "build"), a versioning component may automatically associate these different artifacts with content-dependent version identifiers. The corresponding runtime components which handle these artifacts may then process the versioning information and simultaneously handle multiple versions of an artifact.

Some process model artifacts, however, may be managed by legacy runtime components that are part of an established middleware stack. Moreover, some of these artifacts may not be specific to business processes (that is, the artifacts might also be used with other types of application scenarios). Web service endpoints, for example, can be used to expose an Enterprise Java Bean ("EJB") as well as to receive messages from within business processes. Because other application scenarios might not require versioning support, the corresponding runtime components may not support such a feature. Adding versioning support for these components could impose significant implementation costs (as well as impact compatibility and behavioral aspects for existing consumers).

Accordingly, methods and mechanisms for automatically and efficiently deploy non-versioning business process artifacts may be provided in association with some embodiments described herein.

DETAILED DESCRIPTION

A business process may coordinate actions performed by people and/or devices. To reflect real-world workflows, a business process may contain asynchronous steps (e.g., user interactions, timeouts, and/or intermediate message receipts). As a result, a business process might span a significant period of time, sometimes lasting several months. As business processes may be subject to strict correctness criteria, Business Process Management Software ("BPMS") applications may find it difficult to ensure a predictable behavior for the entire duration of a single process instance. Additionally, newly started process instances may be required to operate in a strictly deterministic way. That is, consecutive runs of the same process should result in identical operations and behaviors. Moreover, intermediate process model changes (e.g., patches and/or updates) should not have an impact on the instances of that process that are already running. Instead, the changes should result in a new, separate process version that is isolated from older process versions (in terms of behavior).

Note that business processes may be associated with complex entities that assemble various artifacts representing different perspectives such as control flow, data flow, and/or connectivity. For example, a process may comprise a Business Process Modeling Notation ("BPMN") model (e.g., associated with a control flow), Extensible Stylesheet Language Transformation ("XSLT") mappings (e.g., associated with a data flow), and/or Web Service Definition Language ("WSDL") interfaces (e.g., associated with a connectivity configuration). When transforming a process model into an executable runtime representation (e.g., a "build"), a versioning component may automatically associate these different artifacts with content-dependent version identifiers to meet correctness criteria (e.g., the predictability and deterministic stability of process models). The corresponding runtime components which handle these artifacts may process the versioning information and simultaneously handle multiple versions of an artifact.

Some process model artifacts may be managed by legacy runtime components which are part of an established middleware stack. Note that, some artifacts may not be specific to business processes (that is, the artifacts may also be used with other types of application scenarios). Web service endpoints, for example, may be used to expose an Enterprise Java Bean ("EJB") as well as to receive messages from within business processes. Because other application scenarios may not require versioning support, the corresponding runtime components might also not support this feature. Adding versioning support for such components not might impose significant implementation costs as well as impact compatibility and behavioral requirements to existing consumers.

Figure 1:
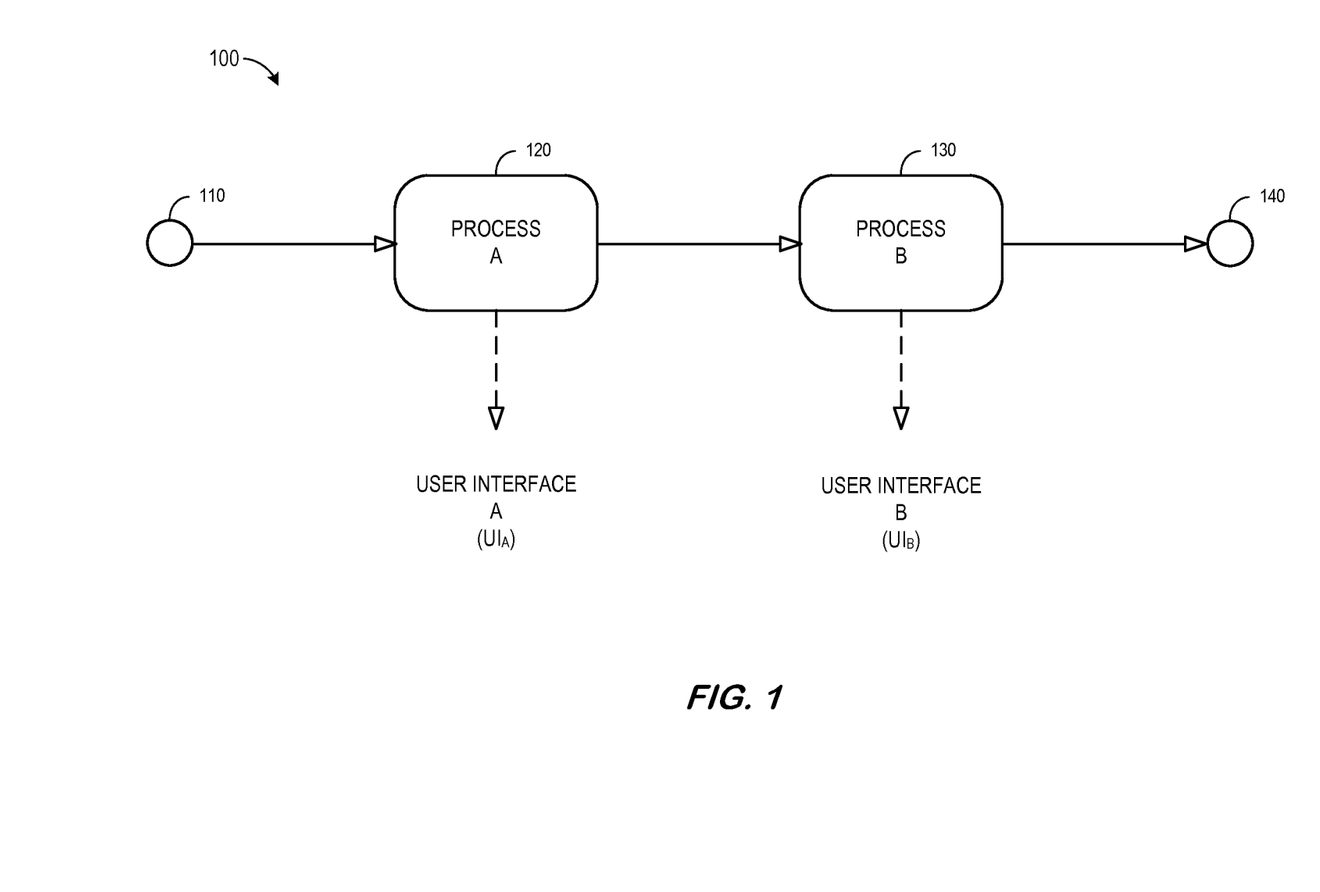
FIG. 1 is an illustration of a business process management model including versioning and non-versioning artifacts.

By way of example, FIG. 1 is an illustration of a business process management model 100 including versioning and non-versioning artifacts. In particular, after starting at element 110, a process A 120 may be executed. The process A 120 may, for example, be associated with a purchase order control flow that supports versioning. According to this example, the process A 120 utilizes a user interface A (UI$_A$) that does not support versioning. When process A 120 is completed, another process B 130 (that also supports versioning) is executed. The process B 130 utilizes a user interface B (UI$_B$) that does not support versioning. The business process management model 100 ends at element 140 when process B completes execution.

Note that the business process management model 100 may be executed many times (and that there may be simultaneous executions or instances of the model 100). In addition, the business process management model 100 may be updated over time (e.g., new versions of the various artifacts in the model 100 might have been created). For example, process A 120 might be modified or even removed from the model 100 at some point in time. In the case where process A 120 was deleted, for example, executions of the model 100 after the deletion would result in a transition from the starting element 110 directly to the process B 130. Further note that both versions of the model might be executing simultaneously (e.g., one execution might have been initiated prior to the deletion while another version was initiated after the deletion).

Figure 2:
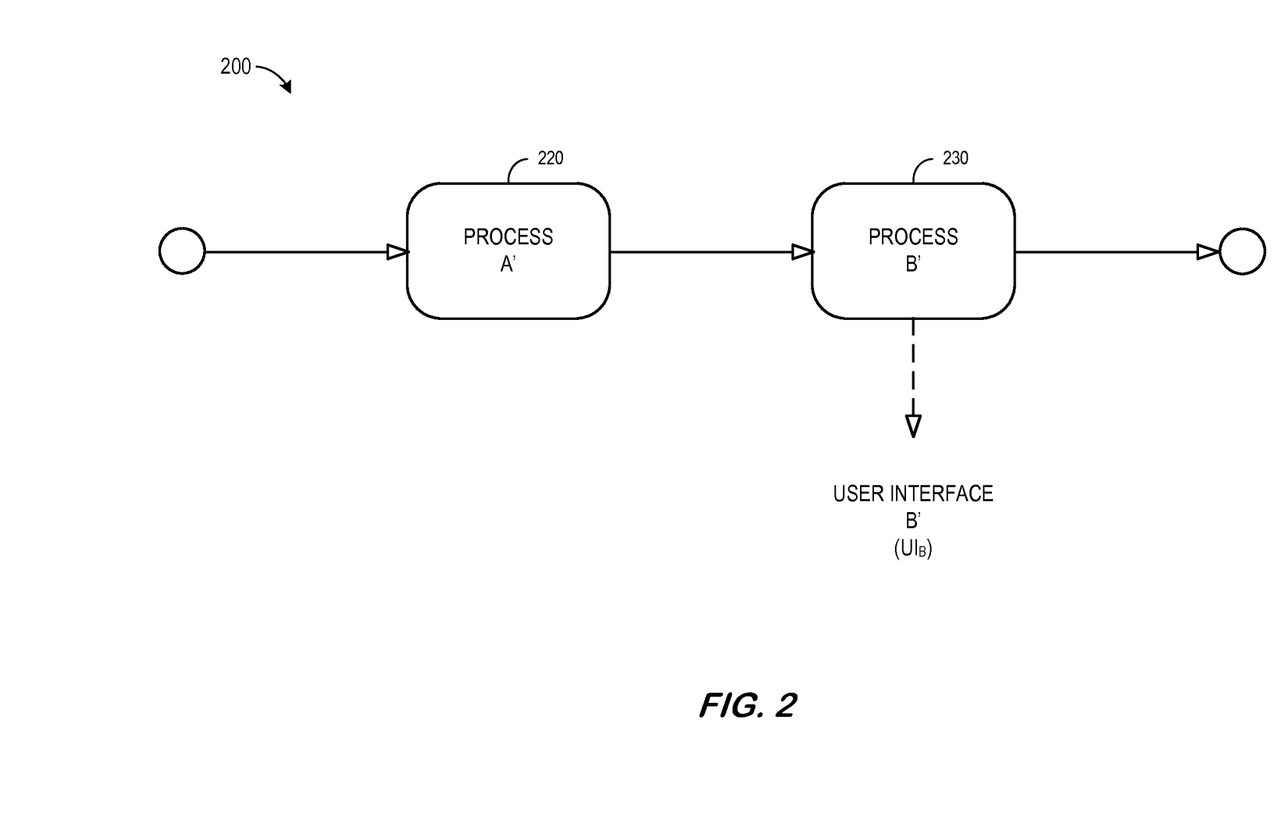
FIG. 2 is an illustration of a business process management model including new artifact versions.

FIG. 2 is an illustration of a business process management model 200 including new artifact versions. In particular, a process A' 220 may initially be executed. The process A' 220 may represent, for example, a new version of the process A120 illustrated in FIG. 1. According to this example, the process A' 220 supports versioning but no longer utilizes a user interface A. When process A' 220 is completed, another process B' 230 (that also supports versioning) is executed. The process B' 230 utilizes an updated user interface B' (UI$_B$) that does not support versioning. The business process management model 200 ends when process B' completes execution. Because the original user interface B' and updated user interface B' do not support versioning, it is difficult to manage multiple instances where some instances need the original user interface B' while other instances need the updated user interface B'. That is, if the updated user interface B' simple replaces the original user interface B the system will be unable to properly execute instances that were initiated before the update.

Figure 3:
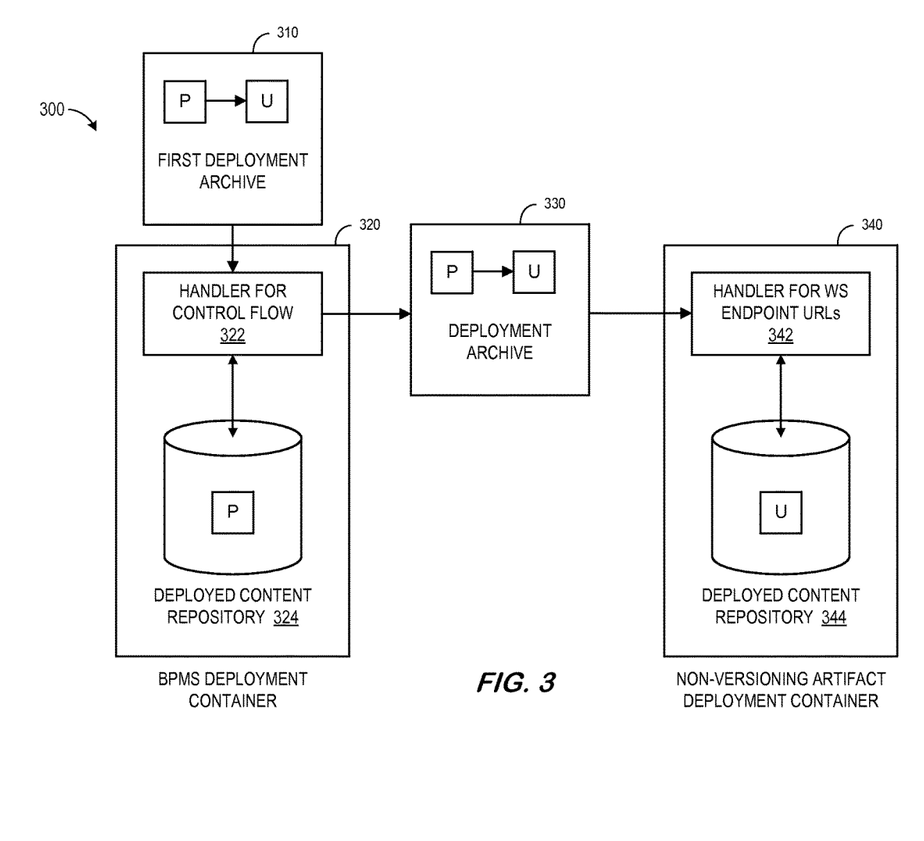
FIG. 3 a block diagram of a system including a business process management software deployment container and a non-versioning artifact deployment container.

Consider, for example, FIG. 3 which is a block diagram of a system 300 that includes a business process management software deployment container 320 and a non-versioning artifact deployment container 340. The business process management software deployment container 320 may, for example, receive an indication of a process P (that supports versioning) and related user interface U (that does not support versioning) from the first deployment archive 310. In particular, a handler for control flow 322 of the deployment container 320 may receive the process P and user interface U from the first deployment archive 310. The handler for control flow 322 may store the process P in a deployed content repository 324 (and when appropriate, retrieve the process P from the deployed content repository 324). The handler for control flow 322 may also provide process P and user interface U to a deployment archive 330 which can provide the non-versioning user interface U to a non-versioning artifact deployment container 340. In particular, a handler for Web Service ("WS") endpoint Uniform Resource Locators ("URLs") 342 may store the user interface U into (and/or retrieve the user interface U from) a deployed content repository 344. If a new user interface U' were to be introduced into the BPMS deployment container it would eventually replace the original user interface U in the deployed content repository 344 (because the versioning is not supported). As a result, the system 300 may be unable to properly execute instances that were initiated before the update.

Figure 4:
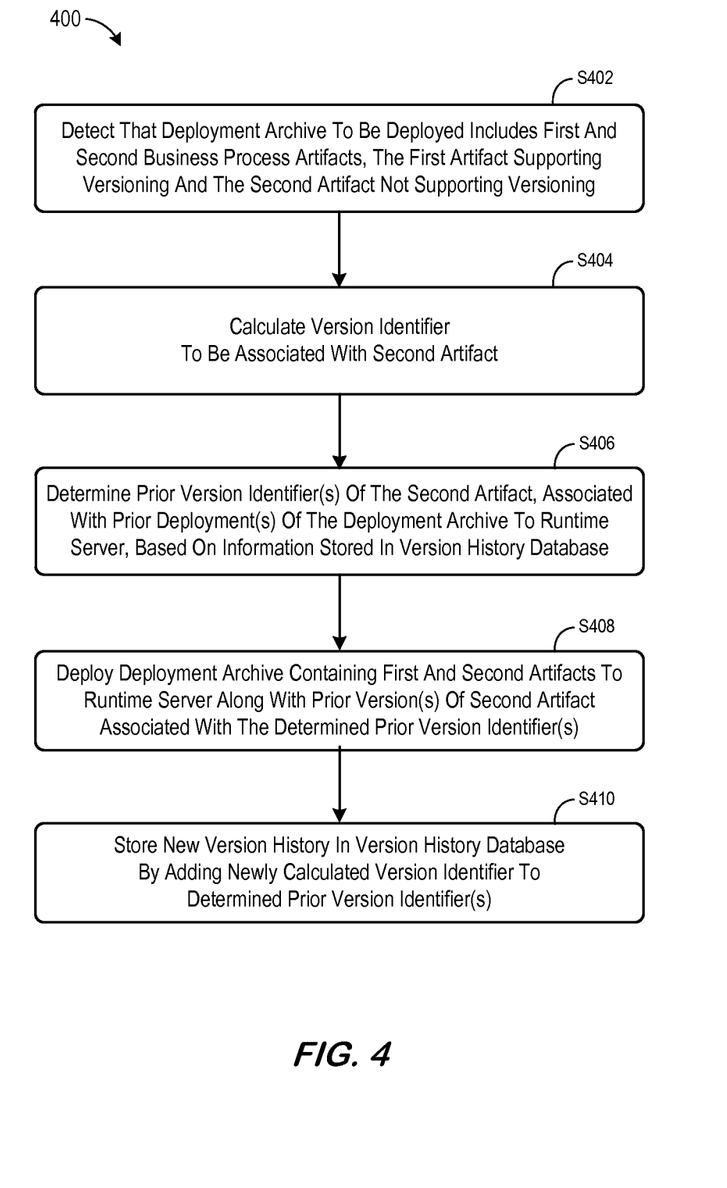
FIG. 4 is a flow diagram of a process in accordance with some embodiments.

To avoid such a result, some embodiments of the present invention may introduce methods and mechanisms for automatically and efficiently deploy non-versioning business process artifacts. For example, FIG. 4 is a flow diagram of a compilation process 300 where a process model is translated into executable binary form in accordance with some embodiments. In particular, the compilation process 300 is a flow diagram illustrating where the process model is translated into binary code for deployment into an application server. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S402, it may be detected that a deployment archive to be deployed to a runtime server includes first and second business process artifacts, wherein the first artifact supports versioning and the second artifact does not support versioning. The first business process artifact might be, for example, associated with a control flow specification, a user task specification, a data flow specification, and/or an interface specification. The second business process artifact might be associated with, for example, a web service endpoint, an enterprise Java bean, a connectivity configuration, and/or or a user interface.

At S404, a version identifier to be associated with the second artifact may be automatically calculated or generated. The version identifier might be associated with, for example, a hash value, and/or an MD5 fingerprint. At least one prior version identifier of the second artifact may be determined at S406 based on information from a version history database. The prior version identifier may be associated with, for example, at least one prior deployment of the deployment archive to the runtime server.

The deployment archive containing the first and second artifacts may then be deployed to the runtime server at S408 along with the prior version (or versions) of the second artifact associated with the determined prior version identifiers. According to some embodiments, the calculated version identifier may be embedded into the second artifact before the deployment archive is deployed to the runtime server. The calculated version identifier might be, for example, embedded into the second artifact by appending the calculated version identifier to a file name associated with the second artifact. According to another embodiment, the calculated version identifier may be embedded into the second artifact by incorporating the calculated version identifier into an endpoint URL associated with the second artifact. At S410, a new version history may be stored in the version history database by adding the newly calculated version identifier to the at least one determined prior version identifier.

According to some embodiments, a version of an artifact may also be removed or "un-deployed" from the system. In this case, the system may un-deploy the deployment archive containing the first and second artifacts. The associated new version history may then be removed from the version history database according to some embodiments.

Figure 5:
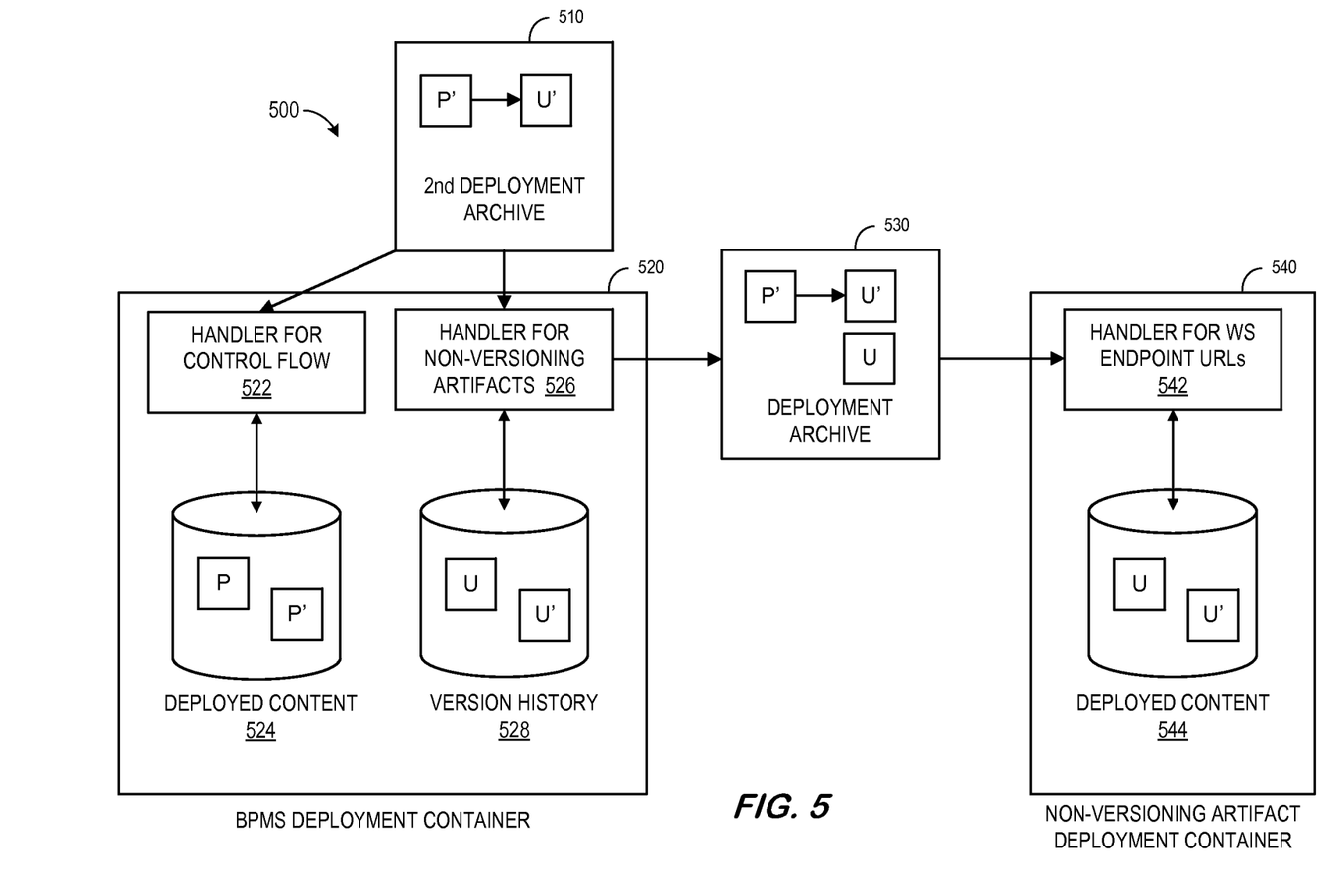
FIG. 5 is a block diagram of a system including a business process management software deployment container and a non-versioning artifact deployment container according to some embodiments.

In this way, non-versioning business process artifacts may be automatically and efficiently deployed. Note that the method of FIG. 4 may be implemented in any of number different hardware configurations. For example, FIG. 5 is a block diagram of a system 500 including a business process management software deployment container 520 and a non-versioning artifact deployment container 540 according to some embodiments. The business process management software deployment container 520 may, for example, receive an indication of a process P' (that supports versioning) and related user interface U' (that does not support versioning) from the first deployment archive 510. In particular, a handler for control flow 522 of the deployment container 520 may receive the process P' from the second deployment archive 510 and a handler for non-versioning artifacts 526 may receive user interface U' from the second deployment archive 510. The handler for control flow 522 may store the process P' in a deployed content repository 524 (and when appropriate, retrieve the process P' from the deployed content repository 524). Note that a prior version of the process (P) is already stored in the deployed content repository 524.

The handler for non-versioning artifacts 526 may store the user interface U' in a version history database 528 (and when appropriate, retrieve the user interface U' from the version history database 528). Note that a prior version of the user interface (U) is already stored in the version history database 528.

The handler for non-versioning artifacts 526 may also provide user interface U and user interface U' to a deployment archive 530 which can provide the non-versioning user interfaces U and U' to the non-versioning artifact deployment container 540. In particular, a handler for Web Service ("WS") endpoint URLs 542 may store the user interfaces U and U' into (and/or retrieve the user interfaces U and U' from) a deployed content repository 544. As a result, the system 500 may properly execute instances that were initiated both before and after the update.

In this way, a generic (e.g., generally reusable) mechanism may be provided to add versioning support for arbitrary process artifacts (e.g., connectivity endpoints or user interfaces) whose runtime components are not natively version aware. As a result, a deterministic execution may be provided for process models that support both versioning and non-versioning artifacts. Moreover, the approach may be compatible with non-versioning scenarios and/or transparency may be provided for artifact handling runtime components that do not need to be changed.

According to some embodiments, non-versioned artifacts (e.g., connectivity configuration, custom Java code, or user interfaces) may be incorporated into a versioned business process control model. Moreover, according to some embodiments, changes to components that handle (e.g., design, build, deploy, or run) the non-versioned artifacts may be avoided. Similarly, changes to the design and/or runtime components of the BPMS application itself may be avoided.

As described with respect to FIG. 5, a versioning module may be provided into a BPM deployment container 520. When a deployment archive R containing process models and related artifacts is deployed into a runtime server, the versioning module may examine the archive R looking for any non-versioned artifacts $A_1 \ldots A_n$ and calculate associated version identifiers $V_1 \ldots V_n$ to uniquely reflect the content of those artifacts. The version identifiers $V_1 \ldots V_n$ may be generated, for example, by calculating an MD5 fingerprint of the artifact's file contents. Those version identifiers $V_1 \ldots V_n$ may then be embedded into the artifacts $A_1 \ldots A_n$. Note that the embedding mechanism may vary based on the type of artifact being processed. For example, in some cases a version identifier might be attached to an artifact's file name. In other cases, a version identifier might be embedded into artifact content. The resulting automatically versioned artifact $A_i'$ represents the original, non-versioned artifact $A_i$ complemented with the version identifier $V_i$.

Moreover, $A_i'$ may be distinguishable from other versions of $A_i'$ by the respective deployment container and runtime components that handle the corresponding artifact type. For example, a web service connectivity configuration might be automatically versioned by including the version identifier within the endpoint URL such that no two Web services endpoints for different WSDL interfaces would point to the same endpoint URL.

The versioning module may then look up older artifacts version which were contained in previous deployments of the archive R from a persistent storage element (e.g., a database). For example, the BPMS deployment module may maintain a database storing the content (process model artifacts and their versions) of any previously deployed archives. As a result, a full deployment history may be found in the database (e.g., a list of artifact versions that were successively deployed over a period of time) and/or may later be reconstructed from that database.

The old artifact versions and the new artifact version may then be combined and merged back into the deployment archive R which is passed to the deployment components that handle the non-versioned artifacts. Next, any automatically versioned artifacts $A_1' \ldots A_n'$ may be stored in the database to be similarly available for future deployments of the deployment archive R.

According to some embodiments, an un-deployment of an archive R might work in a similar fashion. For example, a database lookup may fetch the complete deployment history of the archive R (e.g., including all existing versions of the artifacts $A_1, \ldots, A_n$ contained in R), remove the versions to be un-deployed from the history (e.g., $A_1', \ldots, A_n'$), and then simply deploy the versions that remain.

Thus, some embodiments may bridge the gap between absolute deployments of non-versioned artifacts and relative deployments of versioned artifacts. That is, some embodiments may transform a relative deployment (e.g., where an archive solely contains the latest versions) of artifacts $A_1 \ldots A_n$ into an absolute deployment (e.g., where the archive contains all artifact versions that may need to be available at runtime) of the entire version history of these artifacts $(A_1', A_1'', \ldots), \ldots, (A_n', A_n'', \ldots)$.

Figure 6:
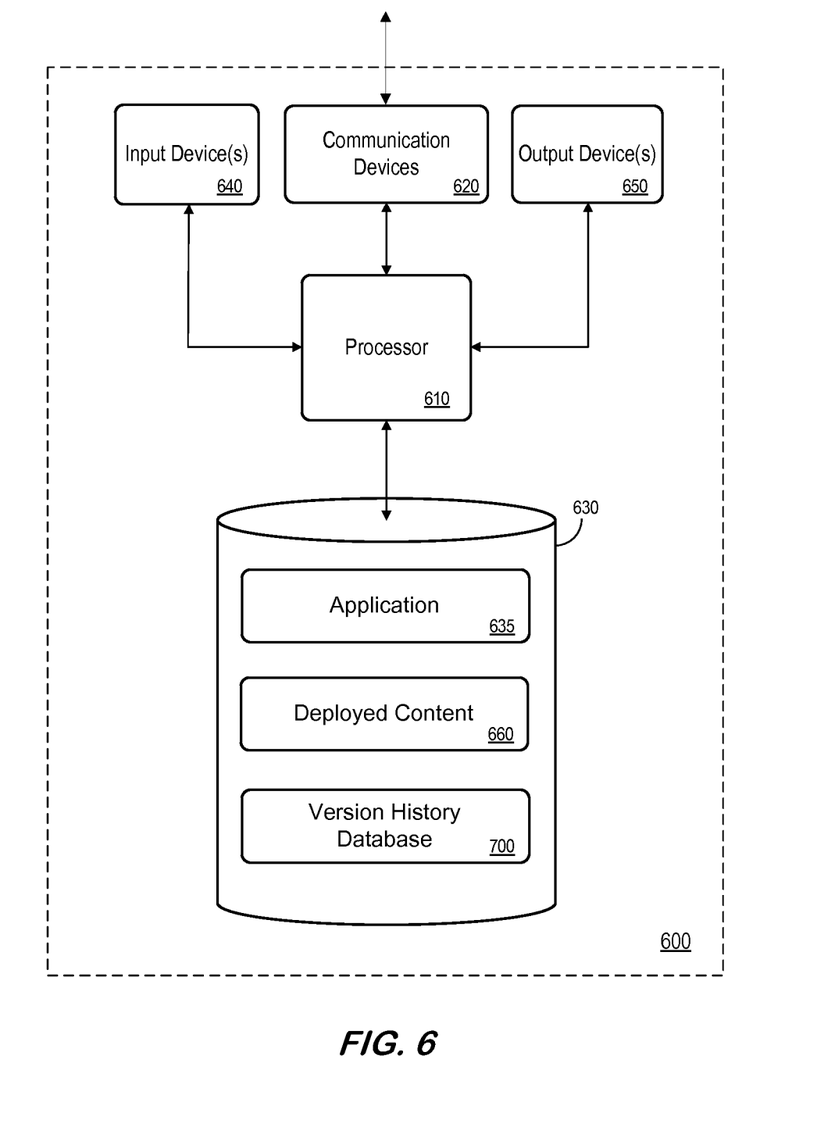
FIG. 6 is a block diagram of a platform associated with a non-versioning artifact handler component in accordance with some embodiments.

FIG. 6 is a block diagram of a platform 600 associated with a non-versioning artifact handler component in accordance with some embodiments. The platform 600 comprises a processor 610, such as one or more INTEL® Pentium® processors, coupled to communication devices 620 configured to communicate with remote devices (not shown in FIG. 6). The communication devices 620 may be used, for example, to receive business process information from a remote server. The processor 610 is also in communication with an input device 640. The input device 640 may comprise, for example, a keyboard or a computer mouse. Such an input device 640 may be used, for example, to receive business process information, artifacts, and/or updates. The processor 610 is also in communication with an output device 650. The output device 650 may comprise, for example, a display screen or printer. Such an output device 650 may be used, for example, to provide reports and/or business process information to remote devices.

The processor 610 is also in communication with a storage device 630. The storage device 630 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

Figure 7:
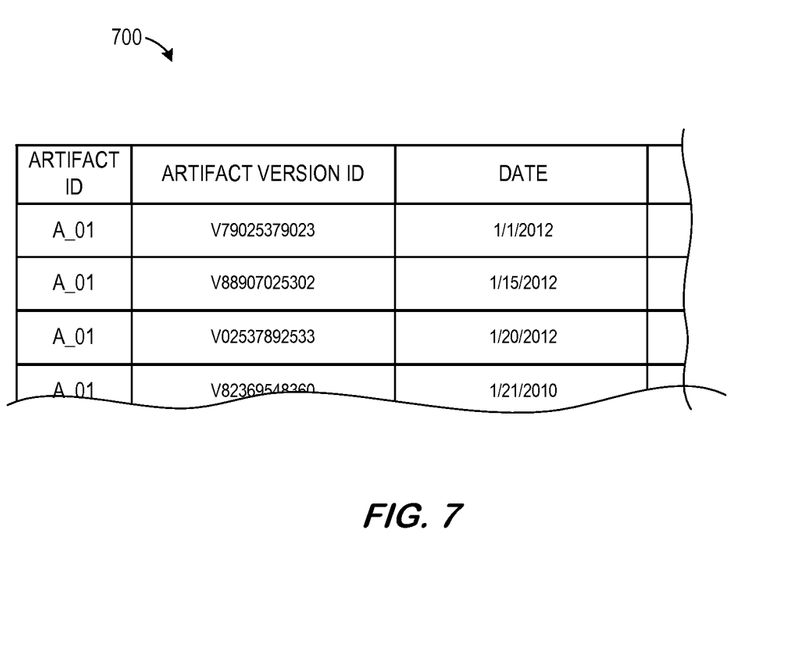
FIG. 7 is a tabular representation of a portion of a version history database according to some embodiments.

The storage device 630 stores an application 635 for controlling the processor 610. The processor 610 performs instructions of the application 635, and thereby operates in accordance any embodiments of the present invention described herein. For example, the processor 610 may detect that a deployment archive to be deployed to a runtime server includes first and second business process artifacts. The first artifact may, for example, support versioning while the second artifact does not support versioning. The processor 610 may calculate a version identifier to be associated with the second artifact, and determine at least one prior version identifier of the second artifact (associated with at least one prior deployment of the deployment archive to the runtime server) based on information from a version history database 700. According to some embodiments, the processor 610 may deploy the deployment archive containing the first and second artifacts to the runtime server along with prior versions of the second artifact associated with the determined prior version identifiers. The deployed content may be stored in a deployed content database 660. A new version history may also be stored in a version history database 700 by adding the newly calculated version identifier to the at least one determined prior version identifier.

As used herein, information may be "received" by or "transmitted" to, for example: (i) the platform 600 from other devices; or (ii) a software application or module within the platform 600 from another software application, module, or any other source.

An example of a version history database 700 that might be used in connection with the platform 600 will now be described. The illustrations and accompanying descriptions of the databases presented herein are exemplary, and any number of other database arrangements could be employed besides those suggested by the figures. FIG. 7 is a tabular representation of a portion of the version history database 700 according to some embodiments. The table 700 includes entries associated with artifacts that have been deployed. The table 700 also defines fields for each of the entries. The fields might specify an artifact identifier, an artifact version identifier, and/or a date associated with a receipt or deployment of an artifact. The information in the database 700 may be created and/or periodically updated based on information generated, for example, when a new artifact is deployed. According to some embodiments, the table 700 may include other information to help facilitate the processing and/or deploying of artifacts (e.g., artifact content).

In this way, the deployment containers for non-versioning artifacts may transparently benefit from the added versioning capabilities, because different artifact versions may appear as completely distinct artifacts to the deployment containers. Moreover, the components that handle non-versioning artifact may not need to be changed to support such a feature (e.g., the procedure may be executed by the BPMS deployment component).

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:
1. A computer-implemented method, comprising:
detecting that a deployment archive to be deployed to a runtime server includes first and second business process artifacts, wherein the first artifact supports versioning and the second artifact does not support versioning;
calculating a version identifier to be associated with the second artifact;
determining at least one prior version identifier of the second artifact, associated with at least one prior deployment of the deployment archive to the runtime server, based on information from a version history database;
deploying the deployment archive containing the first and second artifacts to the runtime server along with the at least one prior version of the second artifact associated with the determined prior version identifiers; and
storing a new version history in the version history database by adding the newly calculated version identifier to the at least one determined prior version identifier.

2. The method of claim 1, wherein the first business process artifact is associated with at least one of: (i) a control flow specification, (ii) a user task specification, (iii) a data flow specification, or (iv) an interface specification.

3. The method of claim 1, wherein the second business process artifact is associated with at least one of: (i) a web service endpoint, (ii) an enterprise Java bean, (iii) a connectivity configuration, or (iv) a user interface.

4. The method of claim 1, wherein the version identifier is associated with at least one of: (i) a hash value, or (ii) an MD5 fingerprint.

5. The method of claim 1, further comprising:
un-deploying the deployment archive containing the first and second artifacts; and
removing the new version history from the version history database.

6. The method of claim 1, further comprising:
embedding the calculated version identifier into the second artifact before the deployment archive is deployed to the runtime server.

7. The method of claim 6, wherein the calculated version identifier is embedded into the second artifact by appending the calculated version identifier to a file name associated with the second artifact.

8. The method of claim 6, wherein the calculated version identifier is embedded into the second artifact by incorporation the calculated version identifier into an endpoint uniform resource locator associated with the second artifact.

9. A non-transitory, computer-readable medium storing program code executable by a computer to perform a method, said method comprising:
detecting that a deployment archive to be deployed to a runtime server includes first and second business process artifacts, wherein the first artifact supports versioning and the second artifact does not support versioning;
calculating a version identifier to be associated with the second artifact;
determining at least one prior version identifier of the second artifact, associated with at least one prior deployment of the deployment archive to the runtime server, based on information from a version history database;
deploying the deployment archive containing the first and second artifacts to the runtime server along with the at least one prior version of the second artifact associated with the determined prior version identifiers; and storing a new version history in the version history database by adding the newly calculated version identifier to the at least one determined prior version identifier.

10. The medium of claim 9, wherein the first business process artifact is associated with at least one of: (i) a control flow specification, (ii) a user task specification, (iii) a data flow specification, or (iv) an interface specification.

11. The medium of claim 9, wherein the second business process artifact is associated with at least one of: (i) a web service endpoint, (ii) an enterprise Java bean, (iii) a connectivity configuration, or (iv) a user interface.

12. The medium of claim 9, wherein the version identifier is associated with at least one of: (i) a hash value, or (ii) an MD5 fingerprint.

13. The medium of claim 9, wherein said method further comprises:
un-deploying the deployment archive containing the first and second artifacts; and
removing the new version history from the version history database.

14. The medium of claim 9, wherein said method further comprises:
embedding the calculated version identifier into the second artifact before the deployment archive is deployed to the runtime server.

15. The medium of claim 14, wherein the calculated version identifier is embedded into the second artifact by appending the calculated version identifier to a file name associated with the second artifact.

16. The medium of claim 14, wherein the calculated version identifier is embedded into the second artifact by incorporation the calculated version identifier into an endpoint uniform resource locator associated with the second artifact.

17. A system, comprising:
a computer; and
a non-transitory, computer-readable medium storing program code executable by the computer to perform a method, said method comprising:
detecting that a deployment archive to be deployed to a runtime server includes first and second business process artifacts, wherein the first artifact supports versioning and the second artifact does not support versioning;
calculating a version identifier to be associated with the second artifact;
determining at least one prior version identifier of the second artifact, associated with at least one prior deployment of the deployment archive to the runtime server, based on information from a version history database;
deploying the deployment archive containing the first and second artifacts to the runtime server along with the at least one prior version of the second artifact associated with the determined prior version identifiers; and
storing a new version history in the version history database by adding the newly calculated version identifier to the at least one determined prior version identifier.

18. The system of claim 17, wherein the first business process artifact is associated with at least one of: (i) a control flow specification, (ii) a user task specification, (iii) a data flow specification, or (iv) an interface specification.

19. The system of claim 17, wherein the second business process artifact is associated with at least one of: (i) a web service endpoint, (ii) an enterprise Java bean, (iii) a connectivity configuration, or (iv) a user interface.

20. The system of claim 17, wherein the version identifier is associated with at least one of: (i) a hash value, or (ii) an MD5 fingerprint.

* * * * *